United States Patent
Idgunji et al.

(10) Patent No.: US 8,103,990 B2
(45) Date of Patent: Jan. 24, 2012

(54) CHARACTERISING CIRCUIT CELL PERFORMANCE VARIABILITY IN RESPONSE TO PERTURBATIONS IN MANUFACTURING PROCESS PARAMETERS

(75) Inventors: Sachin Satish Idgunji, San Jose, CA (US); Robert Campbell Aitken, San Jose, CA (US)

(73) Assignee: ARM Limited, Cambridge (GB)

( * ) Notice: Subject to any disclaimer, the term of this patent is extended or adjusted under 35 U.S.C. 154(b) by 653 days.

(21) Appl. No.: 12/073,050

(22) Filed: Feb. 28, 2008

(65) Prior Publication Data

US 2009/0222775 A1 Sep. 3, 2009

(51) Int. Cl.
*G06F 17/50* (2006.01)
(52) U.S. Cl. ........................................ 716/100
(58) Field of Classification Search ............... 716/1, 4, 716/100
See application file for complete search history.

(56) References Cited

U.S. PATENT DOCUMENTS

| | | | |
|---|---|---|---|
| 5,790,436 A * | 8/1998 | Chen et al. ............... | 716/136 |
| 7,882,471 B1 * | 2/2011 | Kariat et al. ................ | 716/113 |
| 2001/0034873 A1 * | 10/2001 | Arsintescu .................... | 716/8 |
| 2004/0002844 A1 * | 1/2004 | Jess et al. ..................... | 703/14 |
| 2007/0118331 A1 * | 5/2007 | Venkateswaran et al. .... | 702/179 |
| 2008/0221854 A1 * | 9/2008 | Arimoto et al. ............... | 703/17 |
| 2009/0070716 A1 * | 3/2009 | Joshi et al. ................... | 716/2 |
| 2009/0228250 A1 * | 9/2009 | Phillips ......................... | 703/2 |
| 2010/0293413 A1 * | 11/2010 | Borjon .......................... | 714/35 |

* cited by examiner

*Primary Examiner* — Suchin Parihar
(74) *Attorney, Agent, or Firm* — Nixon & Vanderhye P.C.

(57) ABSTRACT

A technique for characterising variation in a performance parameter(s) of circuit cells within a circuit cell library with perturbations in manufacturing process parameters uses a statistical approach whereby the statistical distribution of performance parameter(s) resulting from a joint distribution across manufacturing process parameter space is determined. The perturbation in manufacturing process parameter which results in a characteristic amount of variation is then identified and common sets of such perturbations used to group families of circuit cells together. Families of circuit cells have a correlation in their response to manufacturing process parameter perturbation and this is represented by a correlation matrix. Variation characterising data generated in accordance with the above technique is used to drive electronic design automation tools in integrated circuit design and manufacture.

14 Claims, 6 Drawing Sheets

FIG. 1

$$D = D_{nom} + K_1 \Delta P_1 + K_2 \Delta P_2 + \ldots$$

| | Cell # | Delay$_{nom}$ | +F$_1$ | -F$_1$ | +F$_2$ | -F$_2$ | +F$_3$ | -F$_3$ | ... |
|---|---|---|---|---|---|---|---|---|---|
| Family 1 { | AND$_1$ | 400 | +50 | -50 | 0 | 0 | 0 | 0 | ... |
| Family 2 { | OR$_1$ | 350 | 0 | 0 | +40 | -40 | 0 | 0 | ... |
|  | OR$_2$ | 375 | 0 | 0 | +45 | -45 | 0 | 0 | ... |
| Family 3 { | MUX$_1$ | 200 | 0 | 0 | 0 | 0 | +50 | -50 | ... |
|  | AND$_2$ | 450 | +60 | -60 | 0 | 0 | 0 | 0 | ... |

CHARACTERISING CIRCUIT CELL PERFORMANCE VARIABILITY IN RESPONSE TO PERTURBATIONS IN MANUFACTURING PROCESS PARAMETERS

BACKGROUND OF THE INVENTION

1. Field of the Invention

This invention relates to the field of circuit cell libraries as used, for example, in the design of integrated circuits. More particularly, this invention relates to the characterizing of performance parameter variability in response to perturbations in manufacturing process parameters for circuit cells within a library of circuit cells.

2. Description of the Prior Art

It is known to provide libraries of circuit cell designs from which complex integrated circuits can be formed. The circuit cells can comprise primitive circuit elements, such as AND gates and OR gates, as well as more complicated circuit cells having more sophisticated functionality. These circuit cell libraries typically specify at a physical level how the circuit of the circuit cell concerned should be formed, e.g. the topology of the semiconductor, metal and other layers forming the circuit cell, the dimensions of such layers, the chemical compositions of such layers and the like. Electronic design automation (EDA) software tools use such circuit cell libraries as one input together with a higher level specification of an integrated circuit design (such as a register transfer language (RTL) file logically defining the integrated circuit) and use these inputs to generate data defining the masks and other required low-level design information needed for the manufacturing process.

An increasingly important aspect of the above methodology is the effect that manufacturing process perturbations can have upon the integrated circuit performance and the yield of correctly operating integrated circuits. A circuit cell library may specify particular nominal design parameters, e.g. dimensions, dopant levels etc, but when the integrated circuit is manufactured there will be some tolerance within which the manufacturing process is able to meet these design parameters, e.g. a layer thickness will vary from the design thickness by a certain amount in accordance with normal statistical variation. As process size diminishes and performance of integrated circuits increases, the tolerances within which the circuit cells can be manufactured and the effect that this has upon the performance parameters of those circuit cells becomes larger and more significant. This can lead to reductions in the performance that can be achieved and reductions in the yield of correctly functioning integrated circuits. As an example, an integrated circuit may contain several critical paths through which a signal must propagate within a certain time if the integrated circuit is to operate correctly. If all of the circuit cells are manufactured exactly to their design specification, then this critical path may be met. However, perturbations within the manufacturing process parameters can adversely affect the signal propagation speed through circuit cells and have the result that critical path timing is no longer met. In order to reduce the adverse effect of such process variations it is known to evaluate how process variations will affect circuit performance using EDA tools. In this way, portions of a design which are too sensitive to process variations can be altered in order to give more margin for manufacturing variations and to permit increased performance to be achieved and/or to increase the manufacturing yield.

Figure 1:
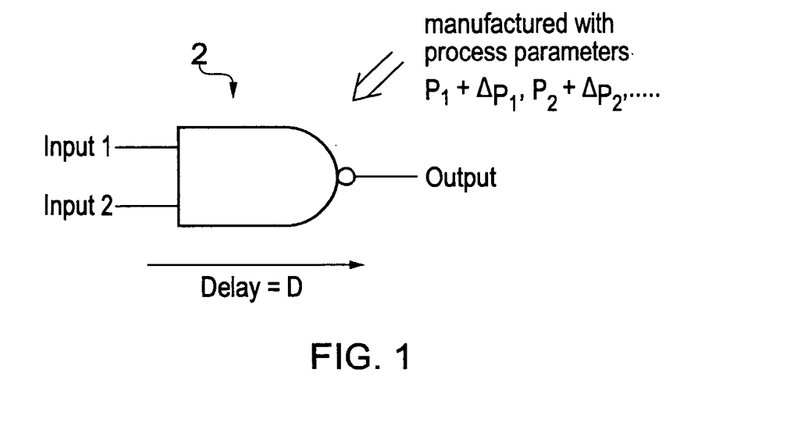
FIG. 1 schematically illustrates a circuit cell.

In order to model the effect of manufacturing process variation upon performance parameters of circuit cells, it is known to provide data representing these variations. FIG. 1 of the accompanying drawings schematically illustrates a circuit cell in the form of NAND gate 2 which when manufactured exactly in accordance with its design parameters have a nominal delay for signal propagation therethrough given by $D_{nom}$. When the circuit cell library is being formed, gate level modeling of the circuit cell 2 using, for example, SPICE models is performed to investigate how the delay through the circuit cell 2 varies with changes in the manufacturing process parameters. At an abstract level, the manufacturing process parameters can be considered to be a set of parameters each having nominal values $p_1$, $p_2$, etc. If the circuit cell 2 is manufactured exactly in accordance with these nominal manufacturing process parameters, then the circuit cell 2 will give the expected nominal delay. However, perturbations to these manufacturing process parameters are likely and these perturbations can be considered as $\Delta p_1$, $\Delta p_2$ etc. The SPICE model of the circuit cell is evaluated at different values of the respective perturbations $\Delta p_1$, $\Delta p_2$ in order to determine coefficients $k_1$, $k_2$, etc associated with each of these perturbations and indicative of how strongly the performance parameter, such as delay, varies with these perturbations.

Figure 2:
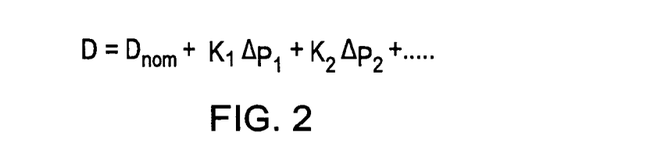
FIG. 2 schematically illustrates the modeling of a performance parameter as a linear series.

FIG. 2 of the accompanying drawings illustrates how the perturbed delay D can be formed as the sum of the nominal delay $D_{nom}$ together with the sum of the changes in the delay produced by each of the perturbations of the respective manufacturing process parameters. This model assumes that the effect of the perturbations of different manufacturing process parameters are independent of one another. This is not always true and results in error within this technique.

A typical circuit cell library will comprise many hundreds of circuit cell designs. When seeking to characterise the nominal performance and the variation in the nominal performance with respect of variations in manufacturing process parameters, SPICE modeling has to be performed in respect of the full set of circuit cells for each process point being investigated. Thus, when attempting to identify the coefficients $k_1$, $k_2$, etc even on the basis of a crude approximation such as sampling one point above the nominal manufacturing process parameter, the nominal process parameter and one point below the nominal process parameter, if there are n circuit cells within the library, this will require the modeling of 2n+1 circuit cell libraries. This large quantity of modeling needed represents a disadvantageous burden upon the generation of appropriately characterised circuit cell libraries.

SUMMARY OF THE INVENTION

Viewed from one aspect the present invention provides a method of characterising variability of a performance parameter associated with perturbations in a plurality of manufacturing process parameters of circuit cells within a library of circuit cells, said method comprising the steps of:

identifying families of circuit cells within said library, each family having one or more substantially common sets of said perturbations that produce corresponding predetermined amounts of change in said performance parameter of a circuit cell away from an unperturbed value of said performance parameter of said circuit cell;

determining respective correlation values between said common sets for different families; and forming a representation of variability for a given circuit cell belonging to a given family as said unperturbed value for said given circuit cell, said one or more predetermined amounts of change for said given circuit cell and correlation values for said given family with respect to other of said families.

The present technique recognises that in practice the designer and the EDA tools are not really concerned with which process parameters produce which changes in performance parameter, rather what is more significant is given a likely statistical distribution of manufacturing process parameters what is the likely statistical distribution of performance parameter that will result. However, in order to retain accuracy within the modeling of variation such a measure of overall statistical variation in response to a joint distribution of manufacturing process parameters is also associated with correlation data indicating how a change in performance parameter of one circuit cell is likely to be correlated with changes in other circuit cells. Thus, the EDA tools or the designer can decide to model a worst case, assumption for a particular circuit cell on a critical path, reliably estimate the likely correlated variation in performance which will result in other circuit cells on that critical path and then produce an overall result to determine whether or not timing is or is not met upon that critical path. Such correlation information compensates for the lack of information concerning how the performance parameter varies with each individual manufacturing process parameter. The technique is applicable to a variety of different performance parameters (e.g. delay, dynamic power, leakage etc), and can be used for various types of statistical behaviour (e.g. between die, within die).

As well as maintaining the ability to accurately model variations in circuit cell performance, the above technique significantly reduces the amount of effort required to generate the variation characterising information. Some pre-processing is required to identify which perturbations produce a variation in performance corresponding to the statistical point of interest, but once this has been produced then SPICE modelling can be performed in respect of a significantly reduced number of instances of the library of circuit cells, e.g. one embodiment would model only the nominal set, the set corresponding to a positive variation equal to one standard deviation and the set corresponding to a negative variation equal to one standard deviation. This could be further reduced to two sets if desired with only the nominal and a single one standard deviation point being modelled. Furthermore, the processing effort required to generate the correlation data is reduced based upon the realisation that in practice individual circuit cells within the library of circuit cells can be classified into families of circuit cells which will relatively closely share the way in which they respond to perturbations of manufacturing process parameters. One example might be that a large number of the AND gates within the library will share the same sensitivities to process parameters and will respond to substantially the same set of perturbations in the manufacturing process to give a one standard deviation variation in nominal performance. These common sets of perturbations for different families can be used to produce correlation values between families indicative of the degree of variation to be expected in those other families when a perturbation(s) giving a certain degree of variation in one family is present. As an example, the perturbations which produce a one standard deviation increase in delay through the family of AND gates may be indicated by the correlation value as likely to produce a one half standard deviation increase in delay through the family of OR gates. This correlation value data modelling the relationship between families of circuits, which can be identified by their common set of perturbations yielding the same degree of performance variation, permits a compact and relatively easy to determine representation of the inter-relationship between variations to be maintained.

As mentioned it is possible that the families can be identified by modeling each circuit cell to find perturbations that produce a given amount of change in the performance parameter concerned and then grouping together cells which have similar sets of perturbations that yield the same result (e.g. sets of perturbations with less than a given separation in manufacturing process parameter space from a common set of perturbations which is associated with the family being formed). As an alternative, it is possible that the circuit cells could be at least partially manually grouped into the families using the knowledge of the circuit cell designer. The circuit cell designer will typically know that a large number of AND gates would likely share the same sensitivities to perturbations in manufacturing process parameters and this knowledge can be used to form the families.

It will be appreciated that the predetermined amounts of change in the performance parameter associated with the substantially common sets of perturbations can take a variety of forms. The amount of change can be a statistically calculated amount, such as a certain multiple of a standard deviation that results from the joint dispersion across manufacturing process parameter space. Another possibility is variation by a fixed amount, e.g. plus or minus 50% of the nominal value. The present technique can be employed in either circumstance.

The identification of families of circuit cells sharing common sets of perturbations can be achieved in a variety of ways, but it is convenient given the complexity of current circuit cell designs and the large number of such circuit cell designs to use models of these circuit cells to determine the performance characteristics as opposed to attempting to calculate these parameters in some other way, such as complex lookup tables. These models may be gate level circuit performance models.

When attempting to identify the set of perturbations which will result in predetermined change in the performance parameter, sampling methods, such as Monte Carlo statistical modeling may be performed.

Whilst the present techniques can be used in respect of a variety of performance parameters, such as power consumption, drive voltage sensitivity and the like, it is well suited to the modeling of signal propagation delay and how this varies with manufacturing process parameter perturbation.

The manufacturing process parameters which can have their influence upon performance parameter modeled can take a wide variety of different forms including a dimension of a structure associated with a circuit cell, a composition of a structure associated with a circuit cell and an electrical characteristic associated with a circuit cell. These manufacturing process parameters can be features of the circuit cell itself or associated features, such as the dimensions of nearby structures (e.g. wells and metal) that are not within the circuit cell itself.

Viewed from another aspect the present invention provides a computer readable library of circuit cells comprising:

one or more designs files specifying circuit cell designs;

one or more performance parameter variation files specifying for each circuit cell a variation in a performance parameter associated with a joint amount of perturbation in manufacturing process parameters of said circuit cell; and a correlation file specifying a correlation value between manufacturing process parameters of different families of circuit cells, each family sharing a substantially common set of perturbations in manufacturing process parameters that produce corresponding predetermined amounts of change in said performance parameter of a circuit cell away from an unperturbed value of said performance parameter.

Viewed from a further aspect the present invention provides a computer program product for controlling a computer to perform computer aided integrated circuit design operations using a library of circuit cells comprising:

one or more designs files specifying circuit cell designs;

one or more performance parameter variation files specifying for each circuit cell a variation in a performance parameter associated with a joint amount of perturbation in manufacturing process parameters of said circuit cell; and a correlation file specifying a correlation value between manufacturing process parameters of different families of circuit cells, each family sharing a substantially common set of perturbations in manufacturing process parameters that producer corresponding predetermined amounts of change in said performance parameter of a circuit cell away from an unperturbed value of said performance parameter.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 schematically illustrates the relationship between cell library data, process variation data, correlation data, EDA tools and mask data generation or the like.

DESCRIPTION OF THE PREFERRED EMBODIMENTS

Figure 3:
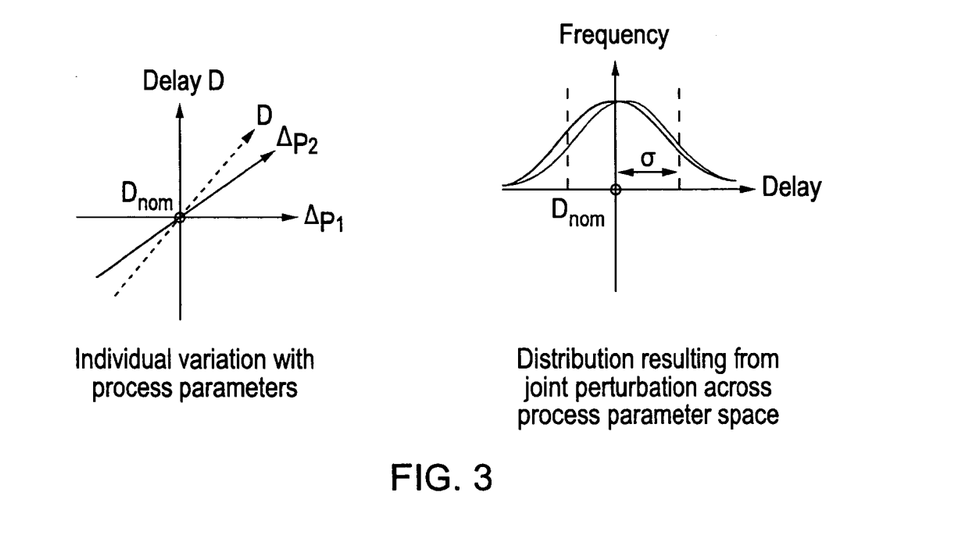
FIG. 3 schematically illustrates the modeling of a performance parameter in respect of manufacturing process parameters and in respect of a distribution resulting from a joint perturbation of process parameters.

FIG. 3 illustrates in the left hand portion how the delay may be modeled in accordance with individual variation of process parameters that are perturbed by amounts $\Delta p_1$ and $\Delta p_2$. This corresponds to the type of modeling discussed in association with FIG. 2. This type of modeling assumes that the effects of the different perturbations are independent of one another. This assumption is not necessarily true, particularly as the physics of the operation of circuit cells becomes more complex with the reduction in process size. When seeking to model these individual variations, a SPICE model can be run with all manufacturing process parameters except one held at their nominal values and then the manufacturing process parameter under investigation varied by modeling with a positive perturbation and a negative perturbation in order to be able to calculate the associated variation coefficient $k_1$, $k_2$ etc.

The right hand portion of FIG. 3 illustrates an alternative approach adopted in accordance with one example of the present techniques. In this approach a distribution of delay is generated which results when a plurality of different multi-dimensional perturbations are modeled spanning a region of process parameter space. At a more practical level, the SPICE model can be run at a variety of points within manufacturing processing parameter space with multiple parameters being perturbed at any one time so as to calculate the delay which will result at each of these points in manufacturing process parameter space. The distribution of these delays relative to the nominal delay is then determined as is illustrated in the right hand portion of FIG. 3 and a characteristic amount of change in delay can be identified. In the example illustrated, this characteristic amount of change in delay identified is plus and minus one standard deviation in the nominal delay value. This change in the performance parameter is used in a number of ways. It gives an indication of the sensitivity of that circuit cell to manufacturing process parameter variations. Furthermore, it is used to identify a set of perturbations in manufacturing process parameter which produces such a change in the performance parameter.

Figure 4:
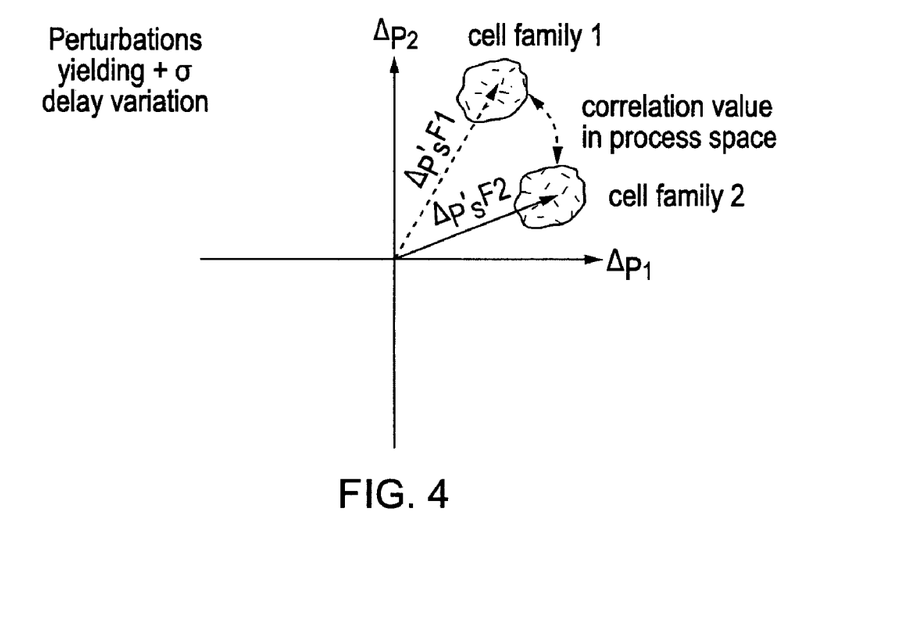
FIG. 4 schematically illustrates the use of substantially common sets of perturbation to identify cell families.

FIG. 4 schematically illustrates how once the standard deviation in performance parameter associated with each circuit cell has been identified, SPICE modeling is used to identify a particular set of perturbations in the manufacturing processing parameters which will result in that given variation in performance parameter. In the case illustrated, the variation in performance parameter is an increase of one standard deviation in the delay. When the perturbations in manufacturing processing parameter which result in such a change in performance parameter are plotted in manufacturing process parameter space it is observed that they group into families. These cell families can be considered to share a common set of manufacturing process perturbations which result in a given degree of performance parameter variation. As an example, one family may be formed of mostly AND gates and another family may be formed of mostly OR gates. It will be appreciated that the absolute values of the delays through the different circuit cells within these families will vary, as will the change in that delay resulting from the substantially common set of perturbations. What is more significant is that the members of the family approximately share a sensitivity to manufacturing process parameter variation, e.g. one family may be particularly sensitive to dopant concentration of a particular type of transistor element with a relatively low sensitivity to oxide layer thickness, whereas another family may have a particular sensitivity to oxide layer thickness and a low sensitivity to dopant concentration.

Also illustrated in FIG. 4 is the concept of the correlation value in process space which is calculated between cell families. This can be considered as a signed product of the vectors associated with the common sets of perturbations in manufacturing process space. In the above example, whilst the OR gates may only have a weak sensitivity to dopant concentration, it is nevertheless significant that if the effect of a change in dopant concentration is being modeled for the AND gates, then an appropriate degree of corresponding change within the OR gates should be simultaneously modeled.

Figure 5:
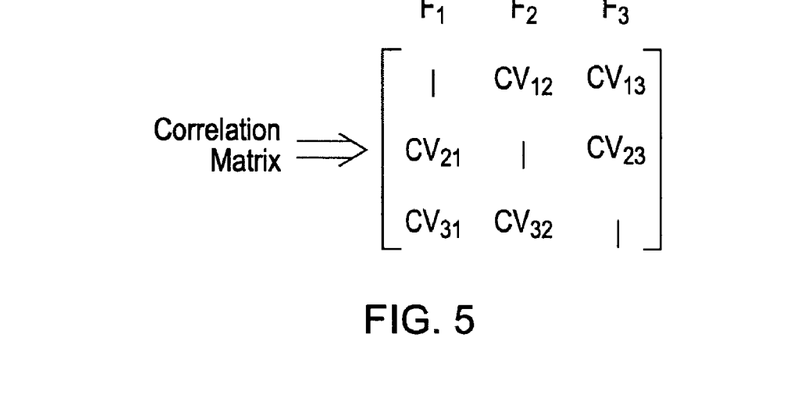
FIG. 5 illustrates a correlation matrix giving correlation values representative of how variation within one family is correlated with variation in another family.

FIG. 5 schematically illustrates a correlation matrix indicative of the correlation of the variations in performance parameter between different families of circuit cells. As will be seen, the main diagonal of the matrix has values of unity as each cell family is fully correlated with itself. The correlation values away from the diagonal will be between plus one and minus one. It may be that a perturbation for one cell family which results in an increase in propagation delay is correlated with a perturbation in another cell family which results in a decrease in propagation delay, i.e. in this example, if the particular variation in manufacturing process parameters occurs, then an increase in the delay through one type of circuit cell will tend to be at least partially compensated for by a decrease in propagation delay through another type of circuit cell.

Figure 6:
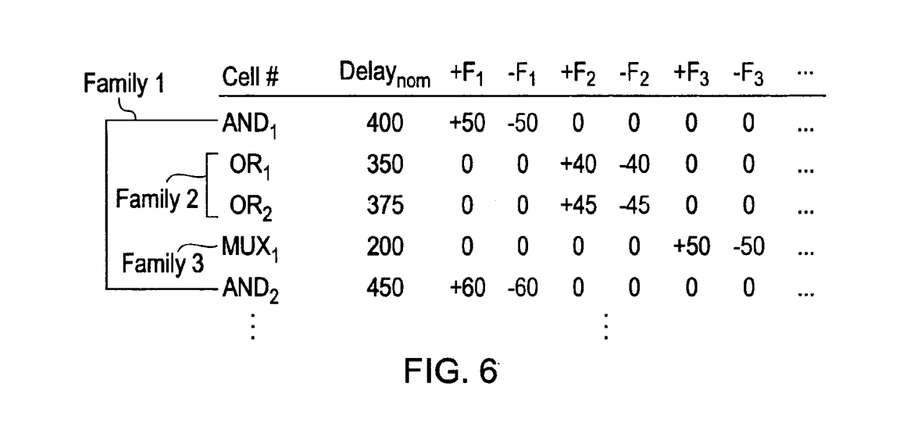
FIG. 6 illustrates the contents of a computer file giving variation characterising data corresponding to circuit cells generated in accordance with one example of the present techniques.

FIG. 6 schematically illustrates a computer file containing data characterising variation of a performance parameter with respect to manufacturing process parameter variation. In practice the file could include multiple performance parameters with their respective variations with process parameters. In this computer file there is a row for each circuit cell. Within each row there is a column giving the nominal delay corresponding to the delay if that circuit cell is manufactured exactly in accordance with its design. There are then a number of columns specifying the variation in the performance parameter which results from manufacturing process parameter perturbations that produce a predetermined amount of change in the performance parameter (e.g. one standard deviation above and below the nominal value). These perturbations express the variation in "circuit cell family space" rather than in "manufacturing process parameter space". As each circuit cell is a member of only one family, it will only have entries within two of the columns corresponding to the positive and negative variations determined from its statistical distribution across joint manufacturing processing parameter space. This type of variation characterising file is indicative of the present technique and is in contrast with such a file based upon the technique illustrated in FIG. 2 wherein there would be columns for each manufacturing process parameter and most entries are non-zero values.

Figure 7:
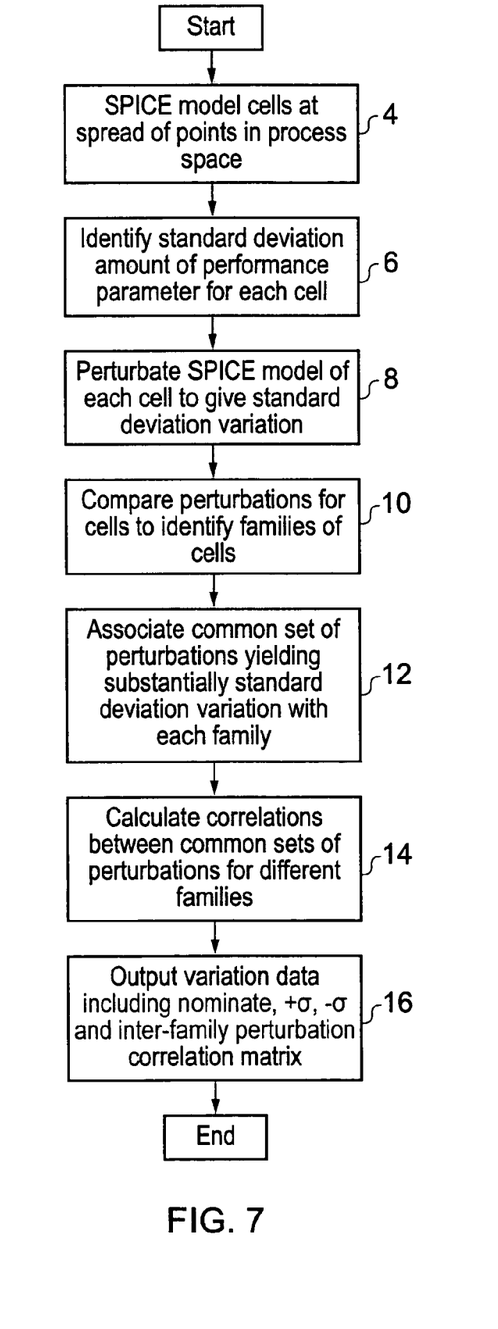
FIG. 7 is a flow diagram schematically illustrating the generation of variation, data in accordance with one example of the present techniques.

FIG. 7 is a flow diagram schematically illustrating the process of variation characterisation. At step 4, SPICE modeling of the cells within the library at a spread of points in manufacturing processing space is performed. The spread across manufacturing process space may be uniform, or may alternatively be targeted at regions known to be close to the change in performance parameter that will be taken as the point to be modeled. At step 6, the standard deviation amount in the performance parameter for each cell given the distribution across manufacturing process parameter space modeled at step 4 is determined. It will be appreciated that small variations in manufacturing process parameter are more likely than large variations in manufacturing process parameter, and accordingly the points modeled at step 4 will take account of the statistically increased likelihood of small manufacturing process variations. The manufacturing process variations can be modeled as having certain statistical distributions, such as normal distribution.

Once the standard deviation amount for each cell has been identified at step 6, step 8 then models the perturbation of each cell so as to identify a set of perturbations which give rise to that standard deviation variation in performance parameter. The identification of the set of perturbations to be used can be tailored to the statistically most likely perturbations so as to reduce the likelihood of identifying a set of perturbations which by chance happens to correspond to a highly statistically unlikely perturbation that nevertheless produces a standard deviation variation in the performance parameter being considered.

Once step 8 has identified the set of perturbations for each cell which produce the standard deviation variation, step 10 compares perturbations of different cells and identifies their spacing within manufacturing process parameter space so as to identify families of cells which have less than a threshold amount of such separation. These families of cells can then be considered to be clustered around a common set of perturbations (e.g. the mean of the perturbations for all the family members) which characterise their joint sensitivity to manufacturing process parameter perturbation. This is the process performed at step 12.

At step 14 the correlations between the common sets of perturbations for different families are calculated and used to population the correlation matrix of FIG. 5. At step 16 the variation data in the form of the table of FIG. 6 and the correlation matrix data of FIG. 5 is generated for supply to EDA tools.

Figure 8:
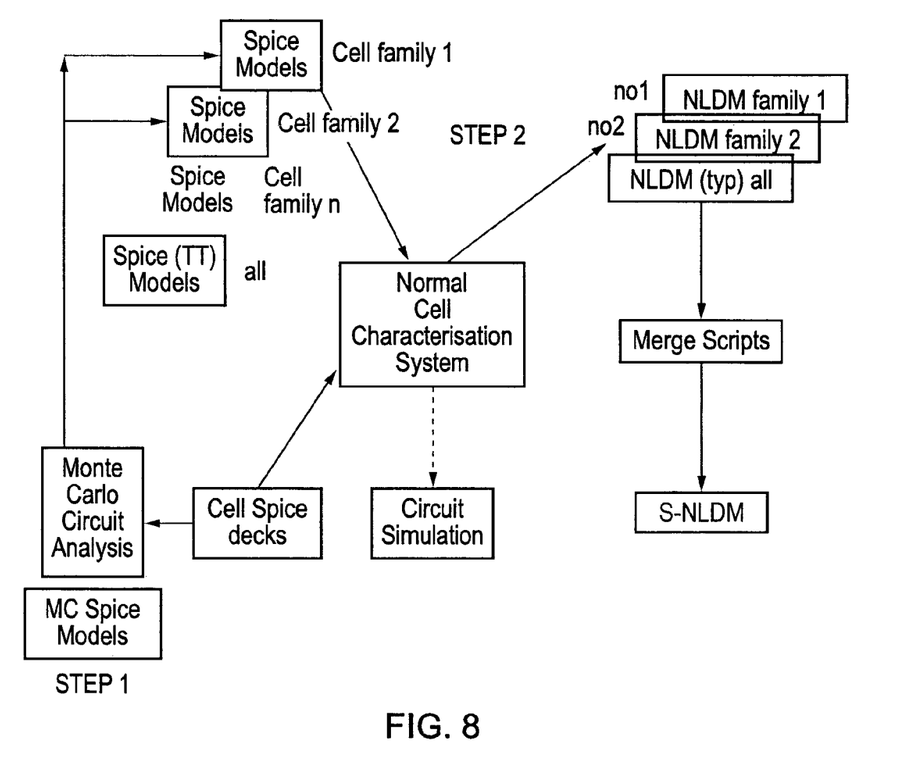
FIG. 8 is a system diagram schematically illustrating how different portions of an overall processing system may be used in accordance with one example of the present techniques.

FIG. 8 schematically illustrates the above process in a different way. In step 1 the entire library of cells is split into families of cells based upon functionality, structure and topology. In this example, this is an at least partial manual grouping as opposed to the automated technique described in relation to FIG. 7. A detailed statistical cell level analysis (e.g. a sampling method such as Monte Carlo analysis based upon a SPICE model) is then performed to identify the statistical distribution of the performance parameter being examined (e.g. delay) and to obtain the measure of the predetermined amount of change in that parameter which characterises the sensitivity of that cell to manufacturing process parameter perturbation (e.g. the standard deviation in the performance parameter across a joint distribution in manufacturing process space).

At step 2, the SPICE models of the circuit cells are perturbed in order to attain the degree of variation in performance parameter identified in step 1 and then regular library characterisation is performed to extract the variation library for the family of cells. This is repeated for each family of cells.

At step 3 the correlation value data that binds the families of cells together is calculated. These correlation values are indicative of the amount of co-variance between the different families.

Figure 9:
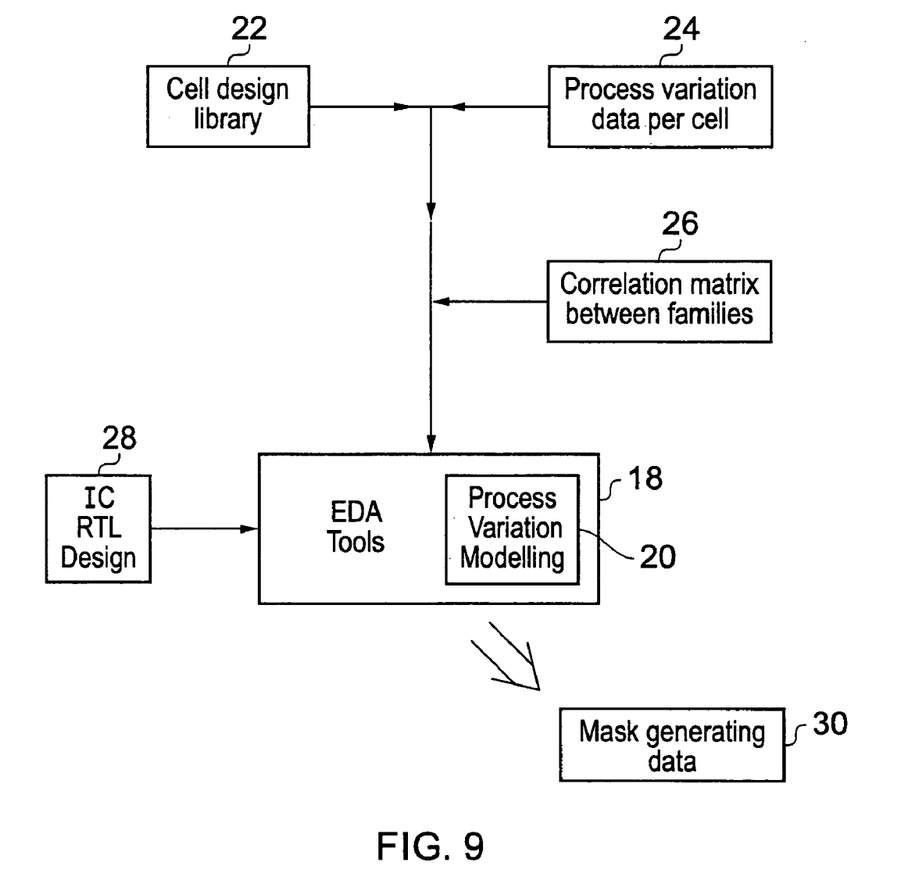

FIG. 9 schematically illustrates the operation of the characterisation technique in combination with EDA tools. The EDA tools 18 themselves are known and include process variation modeling mechanisms 20 which seek to identify how a particular integrated circuit design will be affected by manufacturing process variation. Inputs to the EDA tools include the cell design library 22, the process variation data per cell 24 (see FIG. 6) and the correlation matrix 26 giving the inter-family co-variance in the performance parameter variation.

The EDA tool 18 also receives as an input data defining an integrated circuit design such as an RTL file 28. The EDA tool 18 uses the circuit defined in a logical fashion in the RTL file 28 to select circuit cells from the cell design library 22 to implement that logical design and then place those circuit cells, together with appropriate interconnections, within a design of a form suitable for driving the manufacturing process, such as mask data 30. In addition to generating such mask data 30, the EDA tools 18 are able to use the variation characterising data 24, 26 to model how the design generated will vary in performance given the known variations in manufacturing processing parameter that are likely. This is used to identify problem areas in design or to control the automated processes of the EDA tool 18 in selecting and routing so as to avoid selections and routings which will result in reduced performance or low manufacturing yield once the variation with manufacturing process parameter has been taken into account.

Figure 10:
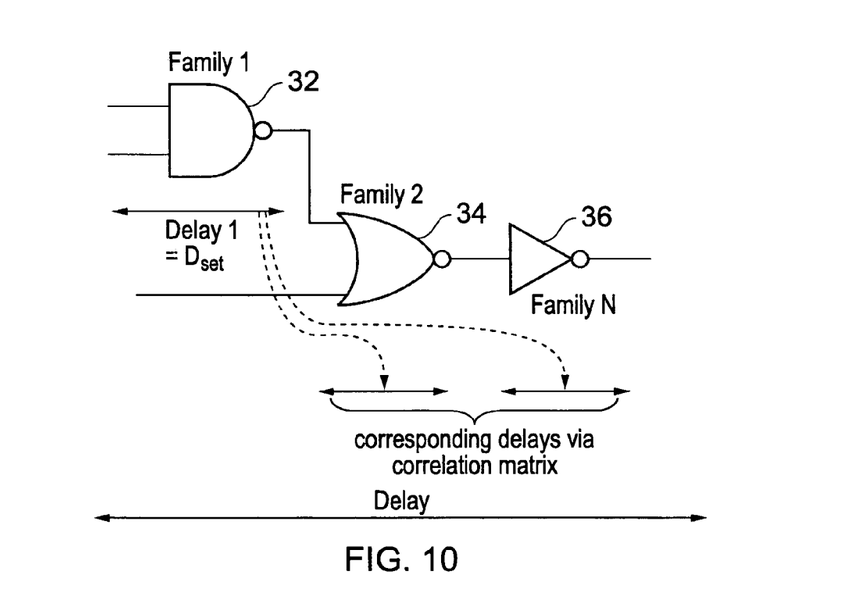
FIG. 10 schematically illustrates how an EDA tool may use the variation data to determine whether or not a portion of an integrated circuit meets a timing constraint when subject to variations in the manufacturing process.

FIG. 10 schematically illustrates how the process variation modeling portion 20 of the EDA tool 18 may operate. A portion of a design that has been formed comprises circuit cells 32, 34 and 36, which are selected from the cell design library 22. These are combined and interconnected as illustrated in FIG. 10 in order to implement the logical design specified by the RTL file 28. The EDA tool is able to calculate the nominal delay through the circuit of FIG. 10. This nominal delay should meet the timing requirements of the overall design. The process variation modeling mechanism 20 then seeks to identify if there is a particular sensitivity to manufacturing process variation. A circuit cell having potentially the largest impact upon meeting the timing requirement is selected and in this example is the AND gate 32. This AND gate 32 is modeled as having its likely worst-case delay corresponding, for example, to an increase in delay by one standard deviation (it will be appreciated that in some circumstances a delay that is too short may be problematic and in such circumstance the delay reduced by a standard deviation may be modeled). Perturbation in manufacturing process parameters which result in the delay of AND gate 32 being modeled are correlated with an associated amount of delay likely within an OR gate 34 and an inverter 36. This correlation is determined from the correlation matrix of FIG. 5 and used in conjunction with the variations specified from the nominal value for those circuit cells within the file of FIG. 6 to determine corresponding delays likely within the OR gate 34 and the inverter 36 when the AND gate has a one standard deviation increase in delay. In this way, the statistical variation with manufacturing process parameter perturbation is investigated for the overall circuit of FIG. 10 and a determination made as to whether in this scenario the circuit of FIG. 10 will still meet its timing requirements. If it will not still meet its timing requirements, then a change can be made in the design, such as placing elements within different pipeline stages, routing changes, placing elements closer together or the like.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of characterising variability of a performance parameter associated with perturbations in a plurality of manufacturing process parameters of circuit cells within a library of circuit cells by using a computer, said method comprising the steps of:
   identifying families of circuit cells within said library, each family having one or more substantially common sets of said perturbations that produce corresponding predetermined amounts of change in said performance parameter of a circuit cell away from an unperturbed value of said performance parameter of said circuit cell;
   determining respective correlation values between said common sets for different families; and
   forming a representation of variability for a given circuit cell belonging to a given family as said unperturbed value for said given circuit cell, said one or more predetermined amounts of change for said given circuit cell and correlation values for said given family with respect to other of said families.

2. A method as claimed in claim 1, wherein said step of identifying:
   determines for each circuit cell one or more sets of perturbations that produce said corresponding predetermined amounts of change; and
   groups circuit cells having substantially common values for said set of perturbations in to respective families.

3. A method as claimed in claim 2, wherein circuit cells with sets of perturbations with less than a given separation in manufacturing process parameter space from a common set of perturbations are grouped to form a family.

4. A method as claimed in claim 1, wherein said circuit cells are at least partially manually grouped in to said families in response to user selections.

5. A method as claimed in claim 1, wherein said predetermined amount of change is a predetermined multiple of a standard deviation of said performance parameter in response to expected variation of said plurality of manufacturing process parameters.

6. A method as claimed in claim 1, wherein said step of identifying uses a model of a circuit cell to determine values of said performance parameter for a plurality of sets of perturbations thereby generating a statistical model of variation in said performance parameter.

7. A method as claimed in claim 6, wherein said model is a gate level circuit performance model.

8. A method as claimed in claim 6, wherein said step of identifying uses a sampling method to form said statistical model.

9. A method as claimed in claim 8, wherein said sampling method is Monte Carlo analysis.

10. A method as claimed in claim 1, wherein said performance parameter comprises a signal propagation delay through a circuit cell.

11. A method as claimed in claim 1, wherein said plurality of manufacturing process parameters comprise one or more of:
   a dimension of a structure associated with said circuit cell;
   a composition of a structure associated with said circuit cell; and
   an electrical characteristic associated with said circuit cell.

12. A non-transitory computer readable storage medium comprising a library of circuit cells having data characterising variability of a performance parameter associated with perturbations in a plurality of manufacturing process parameters of circuit cells within said library, said data being generated in accordance with the method of claim 1.

13. A computer program product comprising a computer readable non-transitory storage medium including a program for controlling a computer to perform computer aided integrated circuit library design operations using a library of circuit cell designs including data characterising variability of a performance parameter produced in accordance with a method as claimed in claim 1.

14. A computer program product comprising a computer readable non-transitory storage medium including a program for controlling a computer to perform computer aided integrated circuit library design operations using a library of circuit cells, said library of circuit cells comprising:
   one or more designs files specifying circuit cell designs;
   one or more performance parameter variation files specifying for each circuit cell a variation in a performance parameter associated with a joint amount of perturbation in manufacturing process parameters of said circuit cell; and a correlation file specifying a correlation value between manufacturing process parameters of different families of circuit cells, each family sharing a substantially common set of perturbations in manufacturing process parameters that produce corresponding predetermined amounts of change in said performance parameter of a circuit cell away from an unperturbed value of said performance parameter; and an electronic design automation tool configured to read said one or more design files, said one or more performance variation files and said correlation files as inputs controlling forming of a design to drive a manufacturing process creating an integrated circuit.

* * * * *